United States Patent
Braunbeck et al.

(10) Patent No.: US 12,330,236 B2
(45) Date of Patent: Jun. 17, 2025

(54) METHOD FOR PRODUCING A WINDING FOR AN ELECTRIC MACHINE AND MATERIAL RESERVOIR FOR SUCH A METHOD

(71) Applicant: Dr. Ing. h.c. F. Porsche Aktiengesellschaft, Stuttgart (DE)

(72) Inventors: Florian Braunbeck, Stuttgart (DE); Markus Omlor, Wuerzburg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 205 days.

(21) Appl. No.: 18/089,894

(22) Filed: Dec. 28, 2022

(65) Prior Publication Data

US 2023/0307997 A1    Sep. 28, 2023

(30) Foreign Application Priority Data

Mar. 23, 2022   (DE) ..................... 10 2022 106 787.4

(51) Int. Cl.
*H02K 15/35*    (2025.01)
*B23K 26/32*    (2014.01)
*B23K 101/38*   (2006.01)

(52) U.S. Cl.
CPC ............. *B23K 26/32* (2013.01); *H02K 15/35* (2025.01); *B23K 2101/38* (2018.08)

(58) Field of Classification Search
CPC ...... B23K 26/32; B23K 26/21; B23K 26/324; B23K 26/354; H02K 15/0081; H02K 3/40; Y10T 29/4009; Y10T 29/49194
See application file for complete search history.

(56) References Cited

U.S. PATENT DOCUMENTS 6,815,012 B2  11/2004  Baumann et al.
8,878,414 B2  11/2014  Mourou et al.
(Continued)

FOREIGN PATENT DOCUMENTS

DE   102017221100 A1   5/2019
DE   102019219683 A1   6/2021
(Continued)

OTHER PUBLICATIONS

German Examination Report dated Oct. 31, 2022.
Machine-generated English-language translation of previously cited JP 2003-125563.

*Primary Examiner* — Donghai D Nguyen
(74) *Attorney, Agent, or Firm* — Gerald E. Hespos; Michael J. Porco

(57) ABSTRACT

A method is provided for producing a winding (1) for an electric machine (10). The winding (1) has conductor elements (2) and two conductor ends (3) of different conductor elements (2) are bonded electrically with one another at a bonding point (4). The method includes arranging at least one material reservoir (5) on the conductor ends (3) to be bonded prior to generating the bonding point (4). The method then includes generating the bonding point (4) by joining the conductor ends (3). The method continues by melting the material reservoir (5) and distributing the molten material reservoir (5) at least over the bonding point (4). Thus, an insulating structure (15) is provided after cooling the distributed material of the material reservoir (5). The insulating structure (15) insulates the conductor ends (3) against their surroundings at least at the bonding point (4).

15 Claims, 3 Drawing Sheets

(56) References Cited

U.S. PATENT DOCUMENTS

| | | | |
|---|---|---|---|
| 10,075,039 B2* | 9/2018 | Ishizuka | H02K 15/0081 |
| 10,763,730 B2 | 9/2020 | Hashimoto et al. | |
| 10,903,614 B2 | 1/2021 | Schneider et al. | |
| 11,444,501 B2* | 9/2022 | Kaneko | H02K 3/40 |
| 2012/0291277 A1 | 11/2012 | Kain et al. | |
| 2016/0118869 A1 | 4/2016 | Nakano et al. | |

FOREIGN PATENT DOCUMENTS

| | | |
|---|---|---|
| DE | 112020004995 T5 | 6/2022 |
| EP | 3332408 | 6/2018 |
| JP | 2003125563 | 4/2003 |
| JP | 2011244627 | 12/2011 |
| JP | 2012235597 | 11/2021 |
| WO | 2009144062 A1 | 12/2009 |

* cited by examiner

METHOD FOR PRODUCING A WINDING FOR AN ELECTRIC MACHINE AND MATERIAL RESERVOIR FOR SUCH A METHOD

CROSS-REFERENCE TO RELATED APPLICATION

This application claims priority on German Patent Application No 10 2022 106 787.4 filed Mar. 23, 2022, the entire disclosure of which is incorporated herein by reference.

BACKGROUND

Field of the Invention. The invention relates to a method of producing a winding for an electric machine. The winding has plural conductor elements, and ends of at least two of the conductor elements are bonded electrically with one another at one or more bonding points.

Related Art Ends of conductor elements of a winding of an electric machine usually are joined together by welding to produce bonding points. However, this frees the conductor ends from their electrical insulation at some points. Sometimes, the conductor ends also are stripped before bonding. Thus, it usually is necessary to insulate the conductor ends electrically at the bonding point and in adjacent areas to avoid short circuits in operation.

DE 10 2019 219 683 A1 discloses coating the conductor ends with anti-corrosive insulation after generating the bonding point.

DE 199 63 492 A1 describes a method for insulating the conductor ends by a powder spray coating, in particular by a polymer layer.

EP 3 332 408 B1 describes a method for producing an electrically insulated electrical conductor and a conductor coil or a conductor rail for a rotating high-voltage machine. To this end, the conductor is wrapped to overlap with an insulation material. The overlapping portions then are welded together using a laser. The conductor must be insulated again after bonding.

By contrast, the problem addressed by the present invention is to provide an improved bonding and insulation of conductor elements. Preferably, the bonding or insulation is reliable and at the same time uncomplicated and economical and can be implemented with as little consumption of resources as possible.

Additional advantages and features of the invention result from the following general description and the description of the exemplary embodiment.

SUMMARY

One aspect of the invention relates to a method for producing a winding for an electric machine. The winding comprises conductor elements. At least two conductor ends of different conductor elements are bonded electrically with one another at least at one bonding point. The method comprises at least the following steps in this or another executable and meaningful sequence. In particular, the method comprises arranging at least one material reservoir on the conductor ends to be bonded prior to generating the bonding point. In particular, the material reservoir is arranged to be spatially separate from the planned bonding point. The method proceeds by generating the bonding point by joining the conductor ends. In particular, the conductor ends are joined together. The bonding point is generated temporally after arranging the material reservoir. In particular, the bonding point is generated to be spatially separate from the material reservoir. The method continues by melting the material reservoir. In particular, the material reservoir is melted after generating the bonding point. The method further includes distributing the molten material reservoir at least over the bonding point. In particular, distribution occurs such that an insulating structure is provided after cooling (and/or solidification) of the distributed material of the material reservoir. In particular, the insulating structure at least insulates the conductor ends against their surroundings at the bonding point.

The method offers many advantages. For example, arranging the material reservoir prior to bonding enables the insulation to be carried out directly subsequently without additional steps and, for example, in the same apparatus. Disposition of the insulation can be carried out where the bonding occurs. Thus, the winding need not be transported to an insulation station and a further process system for insulation can be omitted. A reliable insulating structure also is achieved. Additionally, the entire winding does not need to be heated for insulation. In the prior art, the stator at the insulation station often is heated to temperatures greater than 100° C. Overall, the invention is uncomplicated and provides a resource-sparing opportunity to bond and permanently insulate the conductor ends.

In some embodiments, the material reservoir is pushed onto the conductor ends to be bonded. In particular, the material reservoir may annularly enclose (together) the conductor ends to be bonded and may enclose the conductor ends in pairs. In some embodiments, the material reservoir is configured as a component. For example, the material reservoir may be a sleeve body or at least comprises a sleeve body.

In some embodiments, the conductor ends that are to be bonded are aligned to one another and/or pre-fixed to one another by the material reservoir. In particular, the material reservoir holds the conductor ends to be bonded. Thus, the conductor ends are held by the material reservoir in a position for joining. This simplifies the process of bonding and can be implemented more reliably. This holding is carried out by the sleeve body.

The joining of the conductor ends in some embodiments is carried out by welding with a welding device. The material reservoir also may be melted using the same welding device. Thus, the cost of manufacture can be reduced. Different welding parameters may be used for the melting and for the joining. Other suitable joining types are also possible. In particular, the material reservoir of some embodiments is suitable and configured to be melted by means of the welding device.

In some embodiments, the bonding point that has been generated initially is insulated by the melting of the material reservoir before the bonding points of further associated conductor ends (of the other conductor end pairs) are generated. In other words, after a bonding, the insulation may occur first by melting the material reservoir before the next bonding occurs. This allows synergy effects to be exploited particularly well. However, it is also possible that all bonding points are first generated and only then insulated by melting of the material reservoir. It is also possible, however, that the joining and melting take place in parallel at least at times. In particular, at least two welding devices and, for example, two laser beam sources can be provided.

In some embodiments, the joining of the conductor ends occurs by laser welding using a laser beam source. In particular, a laser beam is generated with the laser beam source and is aimed at the planned bonding point to join the conductor ends there. In particular, the joining is carried out axially on the front side and/or longitudinal side. The material reservoir also may be melted by the same laser beam source. The bonding point thus can be insulated directly in the laser cell. This allows transport and a further system in the production line to be saved.

In some embodiments, the laser beam source may generate a laser beam for melting the material reservoir. In particular, the laser beam may be aimed at the material reservoir, but the focus of the laser beam may lie outside of the material reservoir. This provides a particularly uncomplicated and timely adjustment of the laser beam source to the conditions of melting. In particular, the laser beam may have at least one performance parameter for melting the material reservoir in addition to at least one performance parameter for joining. The performance parameters may be changed to achieve a reduction in power density.

In one embodiment, after joining the conductor ends to be bonded, the laser beam is aimed at the material reservoir arranged on these conductor ends, thereby melting the material reservoir. The laser beam only then is aimed at the further conductor ends to be bonded to join them. This also has the advantage that the heat necessarily introduced into the conductor ends during joining can also be used for the process of melting and distributing the material reservoir.

Gravity may be used for all or some of the distribution of the molten material reservoir. For this purpose, the material reservoir lies above the bonding point at least during melting. In particular, the conductor ends are aligned to be perpendicular. In particular, the material reservoir lies along a perpendicular axis above the bonding point. Thus, the distribution can be passive. This allows a particularly uncomplicated and reliable distribution of the melted material reservoir.

In some embodiments, the material reservoir already is arranged above the bonding point during joining. As a result, a further positioning of the winding and, for example, the stator after bonding can be omitted. The material reservoir also may be arranged in the position in which the winding is located during joining and/or melting.

During joining and/or melting, the planned bonding point preferably is lower than the material reservoir. In particular, the joining and/or melting may occur in a head-first position. The material reservoir also may be carried out in a head-first position. In particular, the material reservoir may be gravitationally above the planned bonding point.

The invention also relates to a material reservoir that can be used to carry out the method described above. In particular, the material reservoir is configured as described above with reference to the method and solves the previously described problems that are addressed by the method.

The material reservoir functions to insulate at least one bonding point between at least two conductor ends of different conductor elements of a winding of an electric machine. In particular, the material reservoir comprises at least one sleeve body consisting of a meltable material or at least comprising a meltable material. In particular, the sleeve body can be pushed onto and/or stuck onto the conductor ends to be bonded. In at least some embodiments, the sleeve body is suitable and configured to fix and/or align the conductor ends. The sleeve body of some embodiments encloses the conductor ends to be bonded annularly. In particular, the molten material provides an insulating structure for the bonding point after cooling.

The material reservoir comprises at least one insulating material. In particular, the material is a plastic, such as a thermoplastic. In particular, the material is an electrical insulator. At least one material reservoir (preferably at least one sleeve body) may be provided for the conductor ends to be bonded (e.g. at least one material reservoir for a pair of conductor ends).

The molten material reservoir of some embodiments is distributed proceeding from the location where the material reservoir was placed up to an axial end and also may be at the front face of the axial end of the bonded conductor ends. The molten material reservoir is distributed such that, after cooling of the material, the insulating structure is formed wherever a previous insulation of the conductor ends has been damaged due to joining and/or wherever a previous insulation of the conductor ends has been stripped and/or wherever the conductor ends have not been electrically insulated before.

The insulating structure may be suitable and configured to insulate the conductor ends against their surroundings at least at the bonding point. In particular, the insulating structure is suitable and configured to avoid possible short circuits in operation. The insulating structure of some embodiments extends at least axially on the front side and/or at least in portions longitudinally on the conductor ends. Thus, the insulating structure may insulate in the vicinity of the bonding point, and preferably also wherever no insulation was previously present.

The bonding point may be arranged on an axial front side of the conductor ends. Additionally, or alternatively, the bonding point can be arranged on a longitudinal side of the conductor ends.

The winding may be a stator winding or a rotor winding. The winding may be produced in a hairpin design (hairpin winding). For this purpose, the conductor elements may be flat conductors or flat wire conductors or hairpin conductors (hairpins). In each case at least two conductor ends of different hairpins are bonded with one another so that the conductor elements are bonded in pairs. The conductor elements to be bonded then respectively correspond to a pair of conductor ends, (hairpin pair). The conductor ends that will be or are bonded also are referred to as associated conductor ends in the context of the following invention.

Further advantages and features of the invention arise from the exemplary embodiments explained below with reference to the accompanying figures.

DETAILED DESCRIPTION

Figure 1:
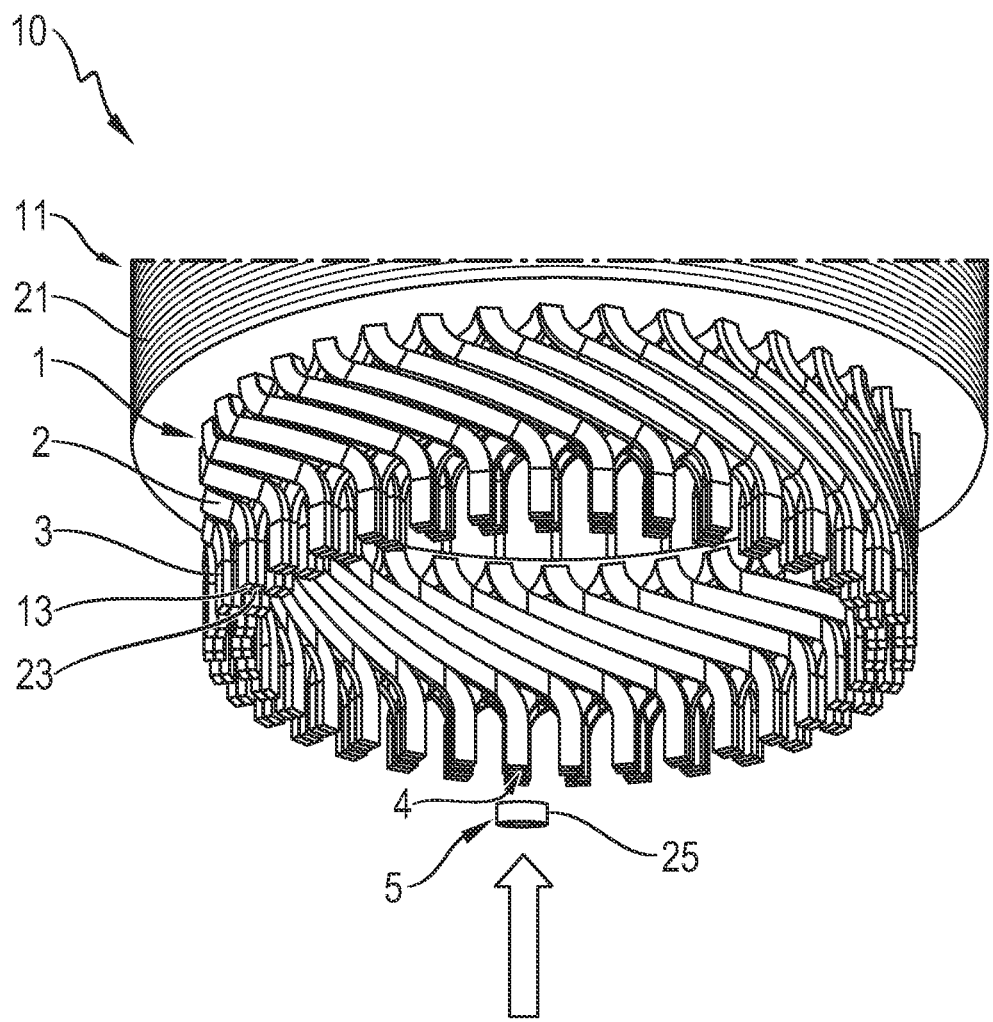
FIG. 1 is a highly schematized detail view of an electric machine having a material reservoir according to the invention during a step for producing the winding according to the method according to the invention.

FIG. 1 shows excerpts of an electric machine 10, of which only one winding 1 of a stator 11 is shown here for better visibility. The winding 1 projects at an axial front face out of a laminated core 21 of the stator 11. For example, the electric machine 10 can still comprise a rotor rotatably supported within the stator 11 and a housing or the like. The electric machine 10 may be a traction motor for a motor vehicle.

The winding 1 has a hairpin design and comprises conductor elements 2 formed as hairpins or flat wire conductors.

The individual conductor elements 2 are bent in the manner of a hairpin and are arranged in the stator 11 such that their conductor ends 3 project out of the stator 11 at a common axial front face.

In the finished electric machine 10, two conductor ends 3, each originating from different conductor elements 2, are bonded electrically at a bonding point 4. As a result, for example, a multi-phase winding is provided.

In the view shown in FIG. 1, the bonding points 4 are not yet produced. The reference numeral 4 indicates a planned bonding point 4 on the front face of the conductor ends 3. In this example, the bonding points 4 are arranged in two rows. For example, the conductor end 13 is bonded with the conductor end 23. The conductor ends 13, 23 lie on the radially outer row.

Prior to bonding, a material reservoir 5 is arranged at the conductor ends 3 to be bonded. The material reservoir 5 is arranged to be spatially separate from the planned bonding point 4. The assembly direction is outlined here by a block arrow. The illustrated material reservoir 5 is configured as a sleeve body 25 and is made of a plastic and preferably a thermoplastic.

The sleeve body 25 can be pushed onto the associated conductor ends 3 and encloses the conductor ends 3 annularly. As a result, the conductor ends 3 are positioned or aligned and pre-fixed prior to their bonding. Purely by way of example, only one material reservoir 5 is shown here. According to the intended purpose, the other associated conductor ends 3 also are equipped with material reservoirs 5 before being bonded. The pushing can occur, for example, individually or in parallel with a corresponding apparatus.

Figure 2:
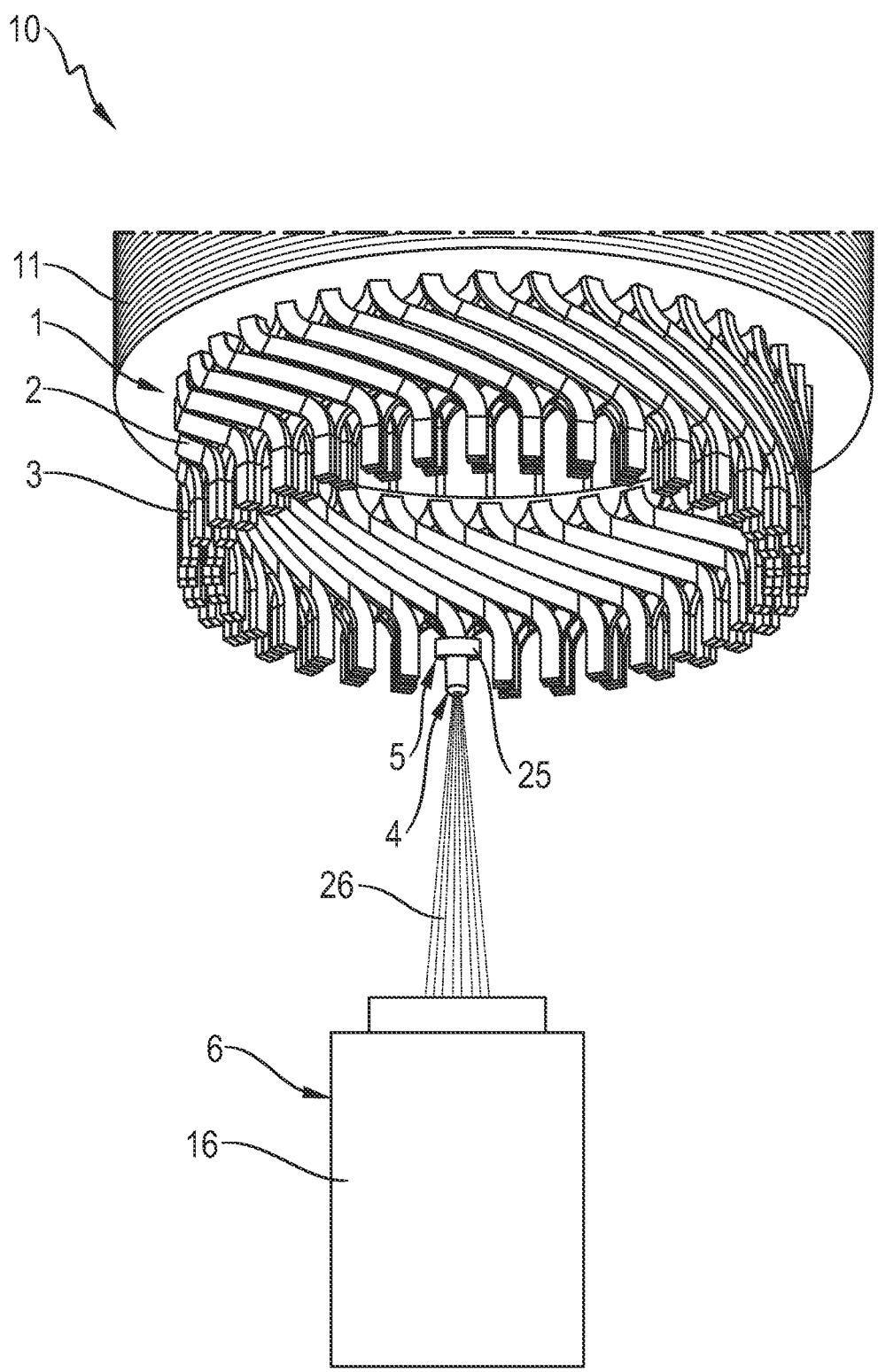
FIG. 2 is a schematic illustration of the electric machine of FIG. 1 during a further step for producing the winding.

The bonding now will be described with reference to FIG. 2. The material reservoir 5 arranged according to the intended purpose can also be seen in FIG. 2. For bonding, the associated conductor ends 3 are joined through welding by means of a welding device 6. The welding device 6 comprises a laser beam source 16 that produces a laser beam 26 to join the conductor ends 3 by laser welding. For this purpose, the laser beam 26 is aimed at the axial front face of the conductor ends 3, for example, so that the bonding point 4 also is generated there.

Figure 3:
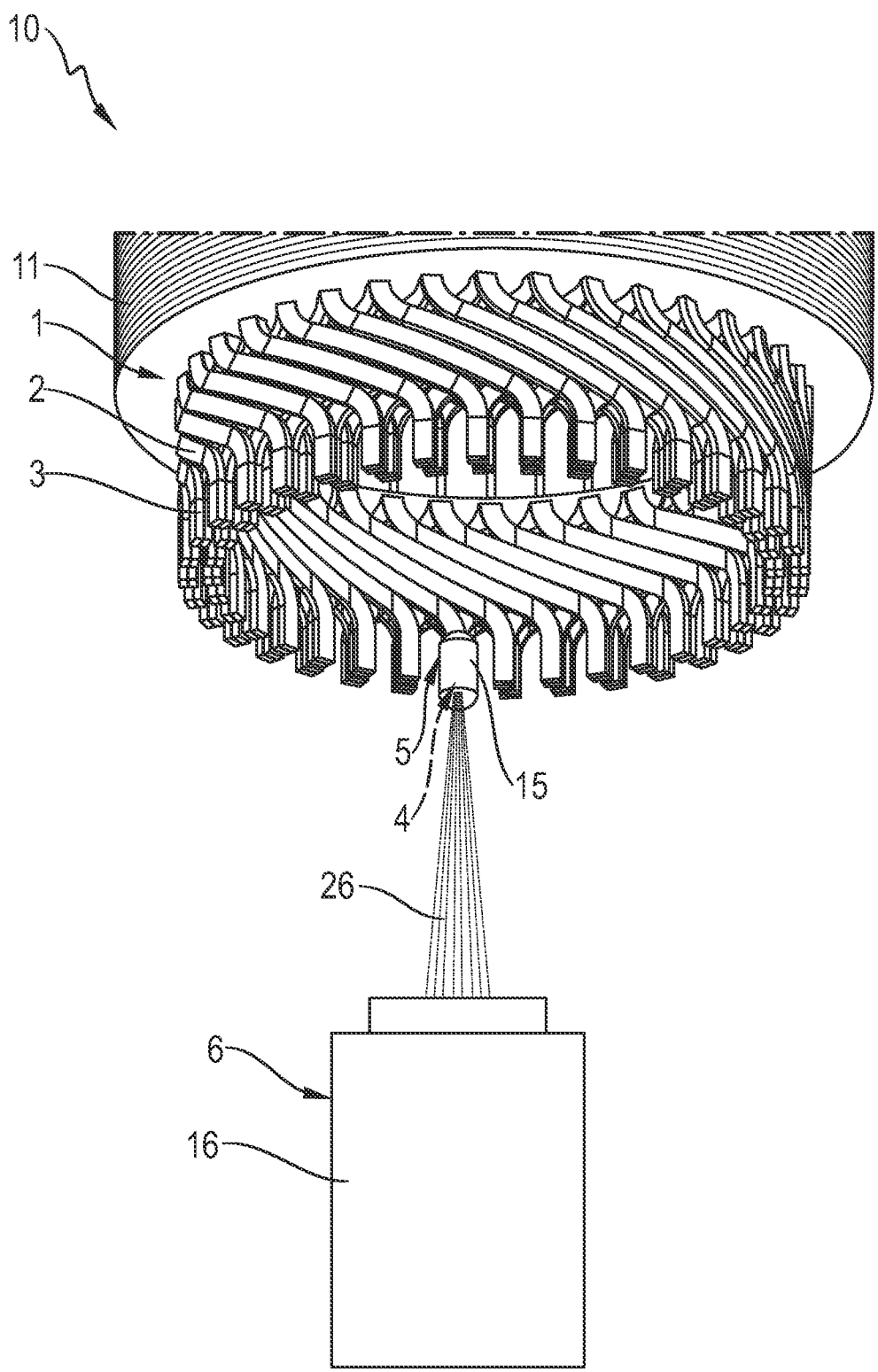
FIG. 3 is a schematic illustration of the electric machine of FIG. 1 during a further step for producing the winding.

FIG. 3 shows the insulation of the bonding point 4. Here, the bonding point 4 now is obstructed completely by the insulating structure 15 and can no longer be seen. The material reservoir 5 is melted. The welding device 6 that was used for generating the bonding point 4 also is used for melting the material reservoir 5. However, the focus of the laser beam 26 is positioned outside of the material reservoir 5, and changed performance parameters also may be used to reduce the energy input and prevent, for example, the vaporization of the material.

The influence of the laser beam 26 causes the material reservoir 5 to melt. The material crawls or creeps downwards due to gravity. The material then cools and solidifies. This forms an insulating structure 15 that insulates the previously uninsulated areas of the conductor ends 3 against their surroundings. The material is distributed so that the insulating structure 15 not only passes through the bonding point 4 but also over a substantial part of the conductor ends 3 or even over the entire conductor ends 3 and insulates them.

The bonding and melting of the material reservoir 5 for the generation of the insulating structure 15 are carried out here in alternation. For this purpose, each bonding point 4 is insulated after the respective bonding point 4 is generated, and the insulation of the previously generated bonding point 4 is achieved directly by melting the material reservoir 5.

The laser beam 26 is aimed alternately at the desired position for the bonding point 4 and then at the material reservoir 5 located above it.

To utilize gravity, both the joining of the conductor ends 3 and the insulation are carried out here in a head-first position. For this purpose, the stator 11 is positioned head-first (i.e. directed downward with the planned bonding points 4) together with the winding 1 in the laser welding apparatus. More particularly, the conductor ends 3 point gravitationally downward and the material reservoirs 5 are gravitational above the planned bonding points 4.

The invention presented herein allows the bonding and insulation of the conductor ends 3 to be carried out in the same system and, for example, in the same laser cell. In addition, the material reservoir allows for an uncomplicated and reliable alignment or pre-fixing of the associated conductor ends 3. Overall, the invention offers an advantageous reduction of the necessary process steps. In addition, synergy effects can be utilized efficiently by the combination of bonding and insulation. The invention also offers significant energy savings by eliminating the need for the separate heating of the stator 11.

The invention claimed is:

1. A method for producing a winding (1) for an electric machine (10), wherein the winding (1) comprises plural conductor elements (2) and each of the conductor elements (2) has a conductor end (3), the conductor ends (3) of at least two of the conductor elements (2) having a planned bonding location at which the conductor ends (3) of the at least two conductor elements (2) are to be bonded electrically with one another, the method comprising:
 arranging at least one insulating material reservoir (5) at positions on the conductor ends (3) of the at least two conductor elements (2) spaced from a planned bonding location;
 generating a bonding point (4) by joining the conductor ends (3) of the at least two conductor elements (2) at the planned bonding location;
 melting the material reservoir (5) after generating the bonding point (4);
 distributing the molten material reservoir (5) at least over the bonding point (4) to produce an insulating structure (15) that insulates at least the conductor ends (3) from surroundings.

2. The method of claim 1, wherein arranging the at least one material reservoir (5) on the conductor ends (3) comprises pushing the material reservoir (5) onto the conductor ends (3) to be bonded so that the at least one material reservoir (5) annularly encloses the conductor ends (3) at locations spaced from the planned bonding location.

3. The method of claim 2, wherein pushing the material reservoir (5) onto the conductor ends (3) aligns and prefixes the conductor ends (3) prior to generating the bonding point (4).

4. The method of claim 1, wherein the joining of the conductor ends (3) is carried out by welding with a welding device (6) and wherein melting the material reservoir (5) is carried out by the welding device (6).

5. The method of claim 1, wherein distributing the molten material reservoir (5) at least over the bonding point (4) is completed before forming a subsequent bonding point (4) on the winding (1).

6. The method of claim 1, wherein the material reservoir (5) lies above the bonding point (4) at least during melting to achieve a distribution of the melted material reservoir (5) by gravity.

7. The method of claim 1, wherein the material reservoir (5) is arranged above the bonding point (4) during joining.

8. The method of claim 1, further comprising cooling the molten material reservoir (5) after distributing the molten material reservoir (5) at least over the bonding point (4).

9. The method of claim 1 wherein the at least one material reservoir (5) is in the form of a sleeve made of a plastic and pushed onto the respective conductor ends to enclose the conductor ends annularly.

10. The method of claim 9 wherein the at least one material reservoir (5) aligns and pre-fixes the conductor ends (3) prior to generating the bonding point (4).

11. The method of claim 9 wherein the at least one material reservoir (5) comprises a plurality of material reservoirs (5) in the form of sleeves made of a plastic.

12. A method for producing a winding (1) for an electric machine (10), wherein the winding (1) comprises plural conductor elements (2) and wherein at least two conductor ends (3) of different conductor elements (2) are bonded electrically with one not east at one bonding point (4), the method comprising:
- arranging at least one material reservoir (5) on the conductor ends (3) to be bonded prior to generating the bonding point (4);
- generating the bonding point (4) by joining the conductor ends (3);
- melting the material reservoir (5);
- distributing the molten material reservoir (5) at least over the bonding point (4) to produce an insulating structure (15) that insulates at least the conductor ends (3) from surroundings,
- wherein, distributing the molten mater reservoir (5) at least over the bonding point (4) is completed before forming a subsequent bonding point (4) on the winding (1), and wherein, after joining the conductor ends (3) to be bonded, the laser beam (26) first is aimed at the material reservoir (5) arranged on said conductor ends (3), and wherein the laser beam (26) only then is aimed at the subsequent bonding point (4) on the winding (1).

13. A method for producing a winding (1) for an electric machine (10), wherein the winding (1) comprises plural conductor elements (2) and where in at least two conductor ends (3) of different conductor elements (2) are bonded electrically with one another at least at one bonding point (4), the method comprising:
- arranging at least one material reservoir(S) on the conductor ends (3) to be bonded prior to generating the bonding point (4);
- generating the bonding point (4) by joining the conductor ends (3) melting the material reservoir (5);
- distributing the molten material reservoir (5) at least over the bonding point (4) to produce an insulating structure (15) that insulates at least the conductor ends (3) from surroundings, wherein the joining the conductor ends (3) is carried out by laser welding with a laser beam source (16), and wherein the melting of the material reservoir (5) also is carried out by the laser beam source (16).

14. The method of claim 13, wherein melting the material reservoir (5) is carried out by aiming a laser beam (26) generated by the laser beam source (16) at the material reservoir (5) so that a focus of the laser beam (26) lies outside of the material reservoir (5).

15. The method of claim 13, wherein melting the material reservoir (5) is carried out by changing at least one performance parameter of the laser beam source (16) to achieve a reduction in power density from a power density used for joining the conductor ends (3).

* * * * *